April 29, 1952  G. K. MEDICUS  2,594,333
GAS ARC TORCH
Filed March 13, 1951 2 SHEETS—SHEET 1
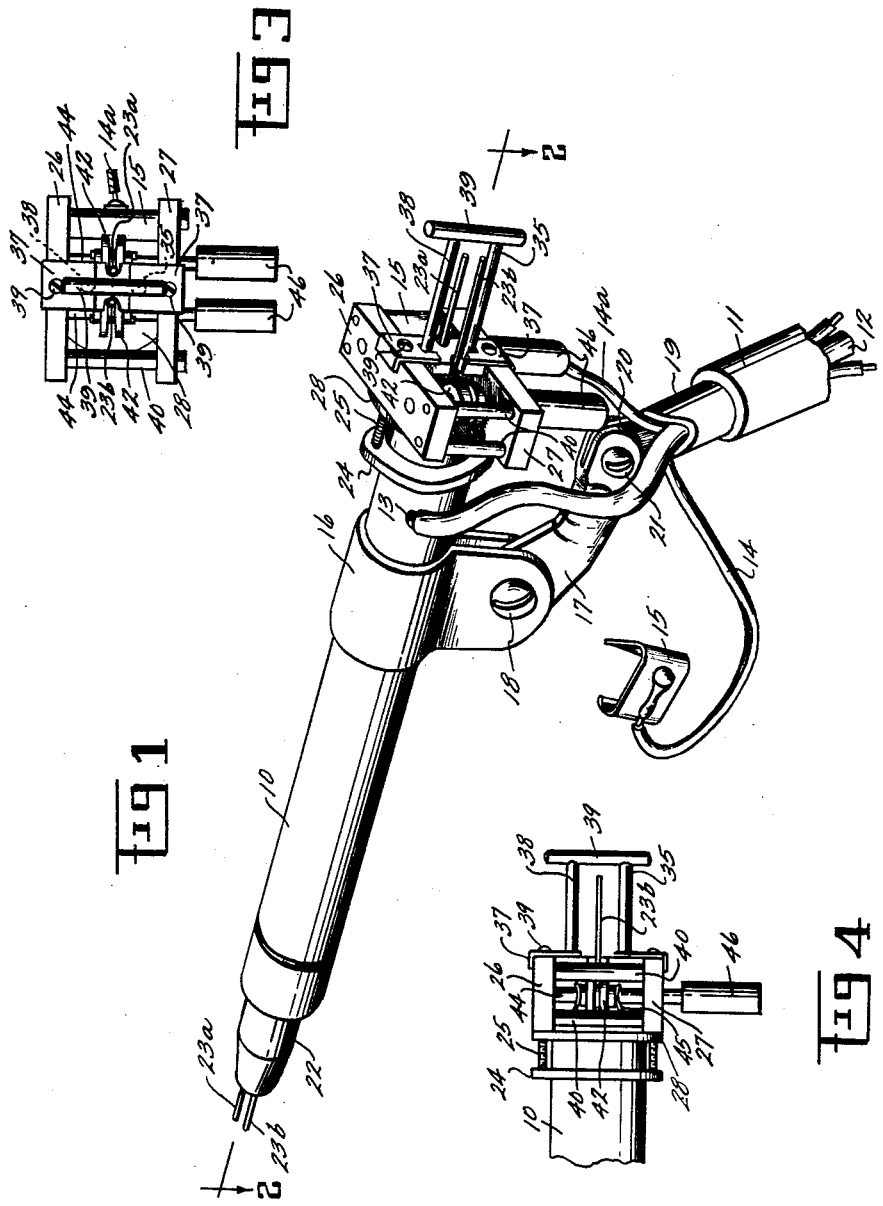
INVENTOR.
GUSTAV K. MEDICUS
BY
ATTORNEYS

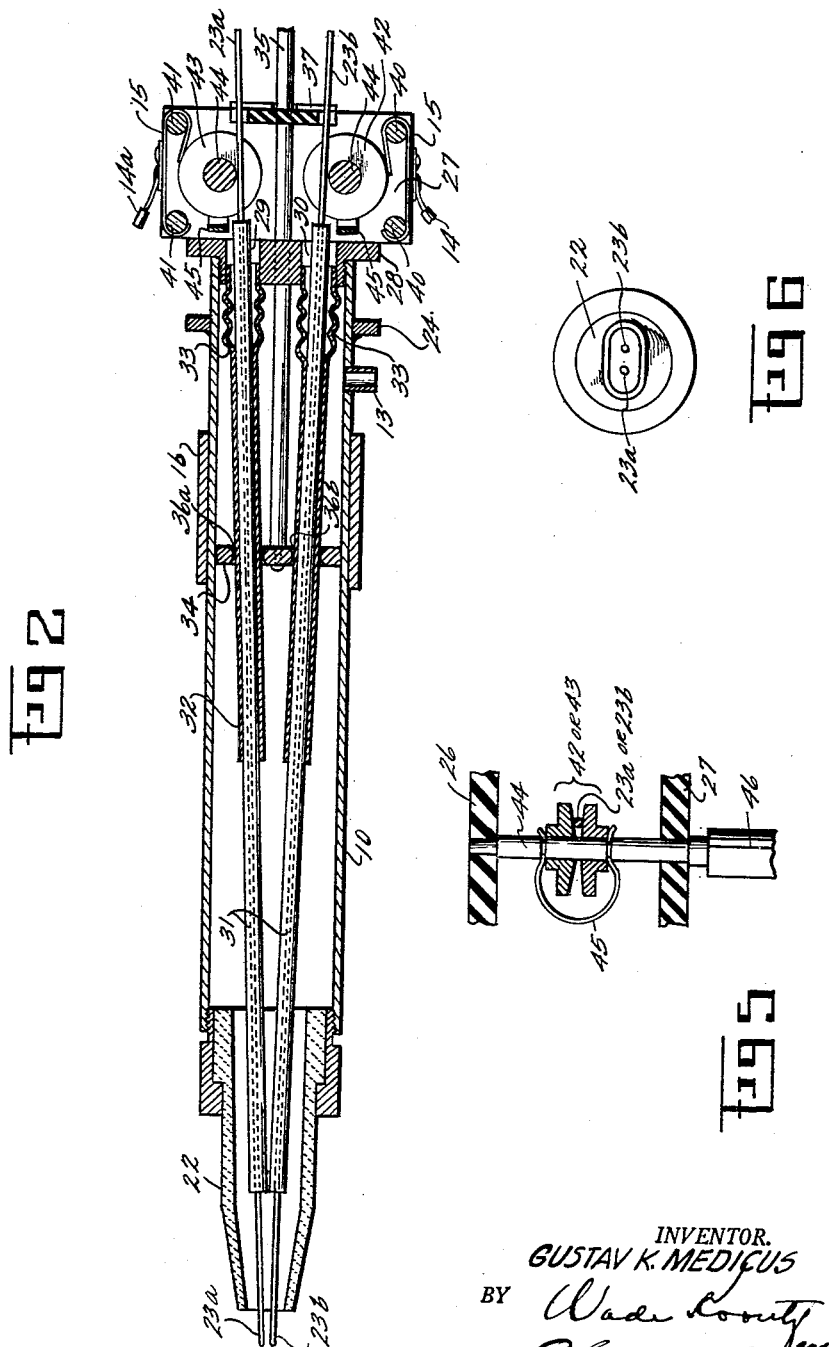

Patented Apr. 29, 1952

2,594,333

UNITED STATES PATENT OFFICE 2,594,333

GAS ARC TORCH

Gustav K. Medicus, Dayton, Ohio

Application March 13, 1951, Serial No. 215,368

5 Claims. (Cl. 219—14)

(Granted under the act of March 3, 1883, as amended April 30, 1928; 370 O. G. 757)

The invention described herein may be manufactured and used by or for the Government for governmental purposes without payment to me of any royalty thereon.

This invention relates to a gas arc torch which is adapted to furnish monatomic or so called "atomic" hydrogen. For the fabrication of small parts, such as are intended, for example, for use in electron tubes, there exists a need for a small torch which is enabled to furnish an extremely hot flame, i. e., one which will melt tungsten. The gas arc torch which is about to be described is such a tool and has been successfully built and operated in a form which weighs only 6 or 7 ounces and which is less than 8″ long. It is therefore capable of use by female workers, who would be at a disadvantage employing a device which would have to be built in larger dimensions.

One object of the invention is therefore to provide a small light arc torch capable of furnishing monatomic hydrogen.

Another object is to provide a gas arc torch in which the electrodes are contained within a single holder and are manually regulatable as to the degree of convergence whereby to regulate the distance of the tips between which the arc develops.

Another object is to provide a torch of the character described in which the feed of each electrode is manually controlled and is independent of the fit of the other electrode.

Referring now to the drawings:

Fig. 1 is a perspective view of the torch, one of the electric leads being discussed;

Fig. 2 is a longitudinal section of the torch taken along the line 2—2 of Fig. 1, the handle being omitted;

Fig. 3 is a rear view of the electrode feed mechanism and of one conductor and one electric lead attached thereto;

Fig. 4 is a side view of the structure shown in Fig. 3 with the addition of a short portion of the barrel;

Fig. 5 is a detail of Fig. 4, showing the electrode feed structure for one electrode, the current supplying structure being removed for clarity, and Fig. 6 is an enlarged front elevation of the nozzle and electrodes.

In Figs. 1 and 2, 10 is a barrel, preferably cylindrical, which may be made of either ceramic material or metal. Handle 11 is shown in Fig. 1 as a fragment, since such handles are conventional. Tube 12 for the introduction of a welding gas preferably commercial hydrogen is arranged in the handle 11, making its exit from the top thereof and connecting to a small inlet pipe 13 at the rear of the barrel. The electrical leads 14 and 14a are also connected through the handle 11. Each lead is provided with a conducting clip 15 of special design which can be later described, but which is shown clearly in Fig. 1. The barrel 10 is encircled by a hinge clip 16 to which is connected a link 17 by means of a pivot 18. The handle 11 terminates in a piece of stiff tubing 19 through which the tube 12 and the leads 14 and 14a emerge. In the tubing 19 the flat link 20 extends from the interior of the handle 11 to the link 17 to which it is attached by a second pivot 21.

The barrel 10 is provided at its feed end with a hollow nozzle 22 from which project two tungsten wire electrodes, the right hand one of which is 23a and the left hand one of which is 23b. These electrodes can also be seen projecting from the rear of the electrode feeding mechanism, which will later be described.

At the rear of the barrel 10 there is a collar 24 which has roughly a diamond shaped pipe, the long dimension being arranged vertically. This collar is tightly attached to the barrel by a press fit at its top and bottom and is provided with holes through which screws 25 project rearwardly. Each screw 25 enters a block 26 of a material which is both electrically insulating and refractory. Such a material may be "Mycalex." In Fig. 1 as in Figs. 3, 4 and 5, the top block is 26 while the lower one is 27.

Referring now to Fig. 2, it will be seen that the electrodes 23a and 23b extend entirely through the barrel 10 and out of each end thereof. They almost come together at the tip of the nozzle 22, however enough space between them exists for the product of an electric arc which is of course in the path of the hydrogen or other gas which fills the interior of the barrel 10 and makes its exit as a stream from the tip of the nozzle 22. As is well known from the teaching of the basic Patent No. 1,947,267 to Irving Langmuir, granted February 13, 1934, the electric arc dissociates the molecular hydrogen ($H_2$) into monatomic hydrogen (H) this process absorbing a large amount of heat from the arc. Upon recombination of the monatomic hydrogen, which takes place only on solid or liquid surfaces i. e., the spot to be welded, this heat reappears with the production of such intense temperature that tungsten may be melted. It is necessary to have the nozzle orifice a rather close fit about the electrodes 23a and 23b so that a high proportion of the hydrogen passes through the arc. Leakage of hydrogen from any other place than the nozzle orifice would be quite objectionable, so the nozzle 22 must fit the barrel 10 closely and a stopper or plug 28 must be provided in the rear for obturating purposes. Since the electrodes must pass through the plug 28, it is provided with openings 29 and 30. Within the barrel 10 and permissibly within the nozzle 22 and extending through the plug 28, each electrode is protected by a ceramic jacket 31. A larger proportion of the length of the jacket 31 is surrounded by flexible metal tubing 32 which at a point near the plug 28 is both expanded and corrugated to form flexible bellows-type joints 33. The uncorrugated rear tips of the tubing 32 fit snugly into the responsive openings 29 and 30, thus forming a gastight joint which is nevertheless flexible to a limited extent. Within the barrel 10 there is a slidable disk 34 to which is attached a rod 35 which is approximately coincidental with the longitudinal axis of the barrel 10. The purpose of the rod 35 is to advance or retract the disk 34 along the interior of the bore of the barrel 10 to which the angle of convergence of the electrodes 23a and 23b. For this purpose the disk 34 is provided with two openings 36a and 36b which are counter-sunk at that face of the disk 34 which is rearwardly directed. A rounded shoulder is thus provided around each opening whereby a limited movement of divergence is allowed to the electrodes and their jacket 31 and tubing covers 32. The further the disk 34 is retracted the closer together will the electrodes 23a and 23b approach at their forward ends.

Referring again to Fig. 1, the rear end of the blocks 26 and 27 are provided with guides 37, the lower one which serves as a bearing for the rod 35 and the upper one of which serves as a bearing for a similar rod 38. The rods 35 and 38 are connected at their rear ends by a vertical rod 39 which is adapted to serve as a handle when the operator desires to move the disk 34 backward or forward to regulate the arc at the outer end of the electrodes. The two symmetrical rods 35 and 38 enter the barrel 10 through the plug or stopper 28. The blocks 26 and 27 are spaced from each other by four conductive rods, 40 indicating the left hand pair and 41 indicating the right hand pair. The clips 15 are shaped as shown in Fig. 1 so that they may engage a pair of rods 40 or 41 and at the same time touch the sheave wheel 42 or 43, left and right respectively, which in turn engage the electrodes 23a and 23b. A conductive path is therefore established from the conductor 14 through the clip 15, the rods 40 or 41, the sheave wheels 42 and 43 and electrodes 23a and 23b. The conductive path of course takes in the arc which is formed at the point of convergence of the electrodes which is outside of the torch itself.

As may be seen from Fig. 5 the sheave wheels 42 and 43 are made in two unconnected parts, each of which is mounted upon a common vertical axle 44. Each pair of sheave-wheel halves are held together by a clip 45. The clip is provided for the purpose of frictionally engaging the sheave wheel halves with the electrode 23a or 23b the vertical wheels 44 extend from the upper block 26 to the lower block 27 and are each provided at the lower part with a hand wheel 46 which is exactly manipulated with the fingers. Turning a hand wheel 46 will turn the sheave wheel and frictionally feed or retract an electrode 23a or 23b.

Certain relative dimensions are desirable if the torch is to be made small enough for work on small parts. These conditions are as follows: The cross section, and therewith the conduction of heat, of the cathode must be small. Practically, the cathode-diameter must not be larger than about 1 mm., generally being about ½ to ¾ mm. In this way it is possible to maintain the high enough temperature of the cathode-tip which is necessary for a stable arc-discharge, when relatively small currents (about 5 to 10 a.) are used to produce small arcs. To achieve very small arcs, it is necessary to use direct current so as to avoid cooling periods during the inevitable interruptions of the alternating current discharge.

The form, more or less horseshoe-like, the length of the arc, and the welding properties of the flame, (an index of the electrical efficiency of the entire torch) are influenced by the current of hydrogen which passes through the nozzle and blows up on the arc. Therefore it is necessary to adjust the current of hydrogen by means of a suitable valve (not shown because conventional). It is also important to have the correct form of the nozzle. By the form of the latter, especially the termination of its orifice, the following factors are essentially influenced:

a. The form of the flame created by the burning hydrogen flowing into the open air, and accordingly the consumption of hydrogen. The sharpness of the beam of dissociated hydrogen flowing towards the piece to be welded and therewith the area of heating and welding.

b. The consumption of electrodes, insofar as any contact of the hot electrode-tips with air effects oxidation and abnormally increases the consumption of tungsten from the electrodes.

c. A too extensive heating of the piece to be welded, or of parts of it, by the hydrogen flame.

To comply with these requirements, the orifice of the mouthpiece should be shaped as shown in Fig. 6. The cross section of the orifice is preferably an approximate ellipse which surrounds the electrode tips symmetrically, whereby the small axis of the ellipse is about the double of electrode-diameter. The longer axis of the ellipse is somewhat greater than the maximum distance of the electrode-tips. In practice this ellipse is approximated by two parallels, combined on their ends by semicircles. The axial dimension of the cylindrical, or slightly conical (widening towards the inside) orificial hole of the nozzle should be somewhat, or even much longer than the longer axis of the above mentioned ellipse.

The material of the nozzle, which must be a good electrical insulator, must fulfill the following requirements: It must not melt at the relatively high temperatures prevailing at the orifice and it must not crack from the rapid temperature-changes which occur during the operation of the torch. Therefore, the nozzle is made from sintered $Al_2O_3$ or similar material.

What I claim is:

1. A gas-arc torch comprising a barrel, converging electrodes in said barrel, gas-obturating means at the rear end of the bore of said barrel, manually actuable means slidable through said obturating means for regulating the degree of convergence, means independently actuable of each other, including a sheave wheel, adapted to engage the rear portion of each electrode for independently feeding each electrode to convergence with the other electrode, means for supplying welding gas to the interior of said barrel and means for supplying electric current to said electrodes through said sheave wheels.

2. A gas-arc torch according to claim 1 in which each sheave wheel comprises separable halves and with the addition of spring means for holding the halves together and for furnishing a friction grip of the sheave wheel halves on the electrode.

3. A gas-arc torch according to claim 2 in which each sheave wheel half is provided with a vertical axle portion, and with the addition of a roller mounted on each sheave wheel-half vertical axle portion, whereby each sheave wheel may be turned by the operator's fingers to advance or retract an electrode.

4. In a gas-arc torch, a barrel, a refractory nozzle for said barrel, a tip on said nozzle, wire electrodes positioned in said barrel to converge beyond the outer end of said tip, a refractory electrically insulating tube surrounding each electrode in said barrel, a gas-tight refractory electrically insulating plug closing the rear end of said barrel except for openings for the electrodes and their surrounding tubes, a flexible metallic jacket for each electrode tube, said jackets being attached to said plug, convergence-regulating means for said electrodes slidably mounted in said barrel and having a manually adjustable rod extending through said plug, a sheave wheel engaging each electrode beyond the rear end of the barrel and plug, a manually actuable insulated roller for each sheave wheel, means for supplying electric current to said electrodes and means for supplying welding gas to the interior of said barrel.

5. A gas-arc torch according to claim 4 in which the means for supplying electric current to the electrodes comprises a pair of horizontal insulating blocks carried at the rear of the barrel, said sheave wheels and electrodes being positioned between the blocks, a pair of upright rods joining the blocks on both sides thereof, a hinged handle for said torch, one of the hinges thereof being attached to the barrel, electric conductors and a gas conducting tube extending upward through said handle, spring clips on said electric conductors for engaging said pairs of upright rods and for simultaneously making contact with said sheave wheels, whereby to energize the electrodes.

GUSTAV K. MEDICUS.

REFERENCES CITED

The following references are of record in the file of this patent:

UNITED STATES PATENTS

| Number | Name | Date |
| --- | --- | --- |
| 1,750,436 | Sounitza | Mar. 11, 1930 |
| 1,834,991 | Alexander | Dec. 8, 1931 |
| 2,106,692 | Embleton | Jan. 25, 1938 |